(12) United States Patent
Pinos et al.

(10) Patent No.: US 12,513,063 B2
(45) Date of Patent: *Dec. 30, 2025

(54) TECHNIQUES FOR DYNAMIC NETWORK MANAGEMENT

(71) Applicant: Capital One Services, LLC, McLean, VA (US)

(72) Inventors: Bryan Pinos, Williamsburg, VA (US); Christopher Moczydlowski, Ruther Glen, VA (US); John Anand Lourdusamy, Glen Allen, VA (US); Eric Barnum, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,832

(22) Filed: May 21, 2024

(65) Prior Publication Data

US 2024/0305530 A1 Sep. 12, 2024

Related U.S. Application Data

(63) Continuation of application No. 18/124,878, filed on Mar. 22, 2023, now Pat. No. 12,028,216, which is a
(Continued)

(51) Int. Cl.
*H04L 43/04* (2022.01)
*H04L 41/0893* (2022.01)
(Continued)

(52) U.S. Cl.
CPC .......... *H04L 43/04* (2013.01); *H04L 41/0893* (2013.01); *H04L 41/0896* (2013.01); *H04L 41/22* (2013.01); *H04L 43/062* (2013.01); *H04L 43/0876* (2013.01); *H04L 47/20* (2013.01); *H04L 47/2483* (2013.01); *H04L 41/0894* (2022.05); *H04L 67/10* (2013.01)

(58) Field of Classification Search
CPC . H04L 43/04; H04L 41/0893; H04L 41/0896; H04L 41/12; H04L 41/22; H04L 43/062; H04L 43/0876; H04L 47/20; H04L 47/2483; H04L 41/0894; H04L 67/10; H04L 67/75; H04L 43/045; H04L 43/0817
See application file for complete search history.

(56) References Cited

U.S. PATENT DOCUMENTS 7,543,052 B1 * 6/2009 Cesa Klein ........... H04L 43/026
709/224
7,742,406 B1 * 6/2010 Muppala ................ H04L 47/10
370/392
(Continued)

Primary Examiner — El Hadji M Sall
(74) Attorney, Agent, or Firm — KDW Firm PLLC

(57) ABSTRACT

Various embodiments are generally directed to techniques for dynamic network management, such as by monitoring and analyzing network parameters, such as network traffic and network configurations, to enable visualization of network state and improved situational awareness. Some embodiments are particularly directed to providing a graphical user interface (GUI) that utilizes various network parameters to map, characterize, and/or assign attributes to network traffic and resources. In many embodiments, network traffic may be monitored and/or routed based on their attributes.

20 Claims, 8 Drawing Sheets

Related U.S. Application Data continuation of application No. 17/307,068, filed on May 4, 2021, now Pat. No. 11,637,752, which is a continuation of application No. 16/744,917, filed on Jan. 16, 2020, now Pat. No. 11,025,494, which is a continuation of application No. 16/409,208, filed on May 10, 2019, now Pat. No. 10,644,954.

(51) Int. Cl.
| | |
|---|---|
| *H04L 41/0894* | (2022.01) |
| *H04L 41/0896* | (2022.01) |
| *H04L 41/22* | (2022.01) |
| *H04L 43/062* | (2022.01) |
| *H04L 43/0876* | (2022.01) |
| *H04L 47/20* | (2022.01) |
| *H04L 47/2483* | (2022.01) |
| *H04L 67/10* | (2022.01) |

(56) References Cited

U.S. PATENT DOCUMENTS

| | | |
|---|---|---|
| 7,890,813 B2 | 2/2011 | Usynin et al. |
| 7,925,756 B1* | 4/2011 | Riddle ............... H04L 47/10 |
| | | 718/104 |
| 10,679,133 B1 | 6/2020 | Mathur et al. |
| 2008/0215925 A1 | 9/2008 | Degenaro et al. |
| 2009/0182794 A1 | 7/2009 | Sekiguchi |
| 2010/0058120 A1 | 3/2010 | Coleman et al. |
| 2013/0191524 A1 | 7/2013 | Dupre et al. |
| 2015/0161025 A1 | 6/2015 | Baset et al. |
| 2015/0378859 A1 | 12/2015 | Jang et al. |
| 2016/0105353 A1* | 4/2016 | Cociglio ............... H04L 43/50 |
| | | 370/252 |
| 2018/0114126 A1 | 4/2018 | Das et al. |
| 2018/0367399 A1 | 12/2018 | Pani et al. |
| 2019/0095298 A1 | 3/2019 | Fricano et al. |
| 2019/0342146 A1 | 11/2019 | Magcale |

\* cited by examiner

100

200A

200B

300

400

*Traffic Summary* 486

| Branded Book | | | |
|---|---|---|---|
| Application Name | Policy | East | West |
| CC - Transactions API | GeoLocation | 49% | 51% |
| COS | Failover | 0% | 100% |
| CreditWise | Simple | 100% | 0% |
| Dynamic App | Latency | 89% | 11% |

490

| Commercial | | | |
|---|---|---|---|
| Application Name | Policy | East | West |
| CreditPath | Failover | 100% | 0% |
| CRRP | Failover | 100% | 0% |
| ICCE | Simple | 0% | 100% |

492

⋮

| digiTECH | | | |
|---|---|---|---|
| Application Name | Policy | East | West |
| Customer Accounts API | GeoLocation | 69% | 31% |
| Entitlements API | GeoLocation | 66% | 34% |
| SIC App | Weighted | 92% | 8% |

TECHNIQUES FOR DYNAMIC NETWORK MANAGEMENT

RELATED APPLICATION

This application is a continuation of U.S. patent application Ser. No. 18/124,878, filed Mar. 22, 2023, which is a continuation of U.S. patent application Ser. No. 17/307,068, filed May 4, 2021 (issued as U.S. Pat. No. 11,637,752 on Apr. 25, 2023), which is a continuation of U.S. patent application Ser. No. 16/744,917, filed on Jan. 16, 2020 (issued as U.S. Pat. No. 11,025,494 on Jun. 1, 2021), which is a continuation of U.S. patent application Ser. No. 16/409,208, filed on May 10, 2019 (issued as U.S. Pat. No. 10,644,954 on May 5, 2020). The contents of both aforementioned patent applications are incorporated herein by reference in their entireties.

BACKGROUND

Generally, a computer network is a digital telecommunications network which allows nodes, or components, to share resources. In computer networks, computing devices exchange data with each other using connections between nodes via various transmission media, such as via wired or wireless mediums. Computer networks can support a large number of applications and services such as access to the World Wide Web, digital video, digital audio, and shared use of application and storage servers. The amount of data moving across a computer network may be referred to as traffic. Typically, network data in computer networks is encapsulated in network packets, which provide the traffic load in the network. Generally, traffic management may include one or more of network traffic control, network traffic measurement, network traffic simulation, network traffic modeling, and network configuration.

BRIEF DESCRIPTION OF THE DRAWINGS

FIG. 4 illustrates exemplary aspects of a traffic summary according to one or more embodiments described herein.

DETAILED DESCRIPTION

Figure 1:
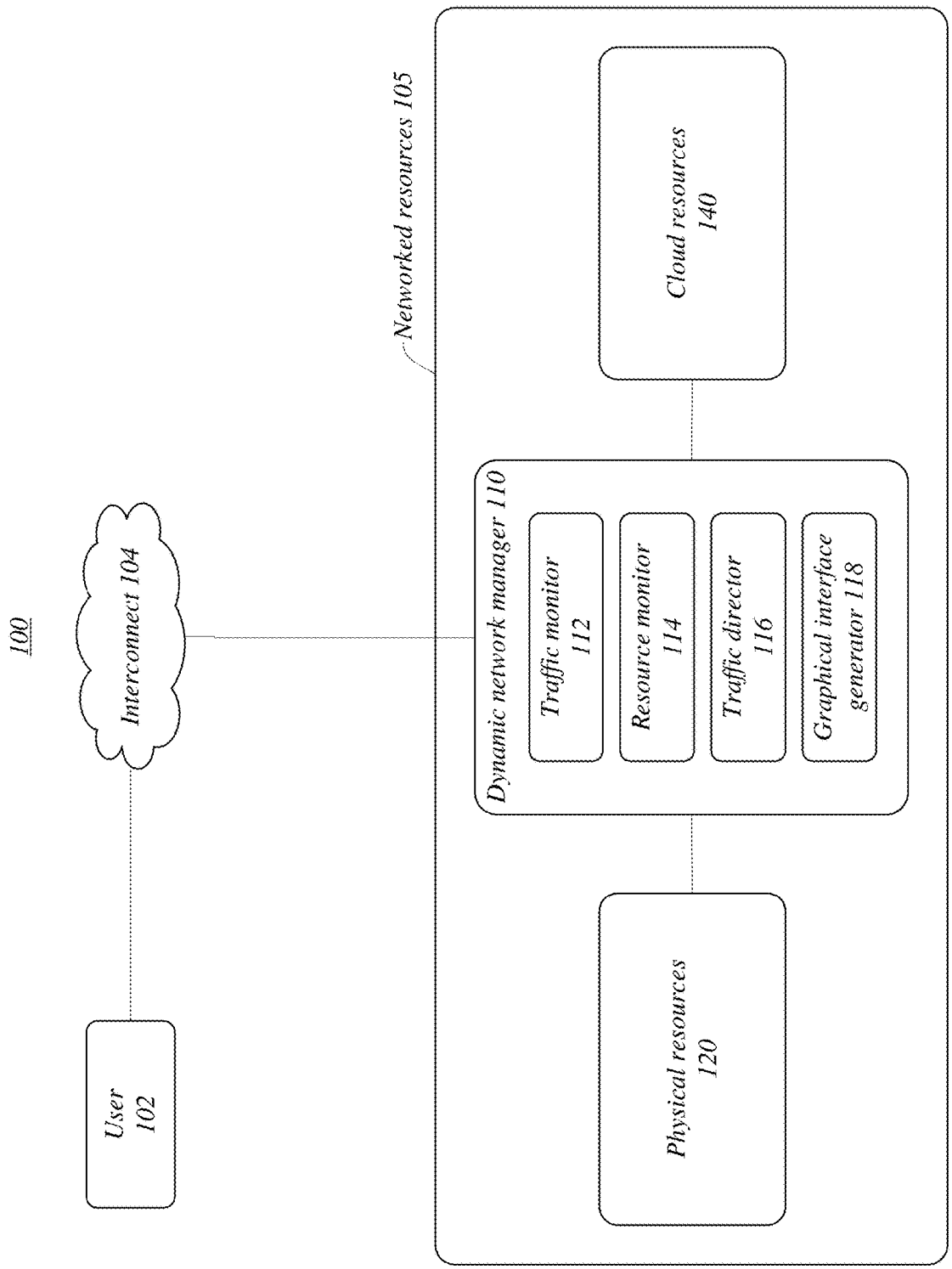
FIG. 1 illustrates an embodiment of a first operating environment according to one or more embodiments described herein.

Various embodiments are generally directed to techniques for dynamic network management, such as by monitoring and analyzing network parameters, such as network traffic and network configurations, to enable visualization of network state and improved situational awareness. Some embodiments are particularly directed to providing a graphical user interface (GUI) that utilizes various network parameters to map, characterize, and/or assign attributes to network traffic and resources. In many embodiments, network traffic may be monitored and/or routed based on their attributes. For example, in various embodiments described herein may provide one or more of the following features and/or functionalities. In some embodiments, a configuration of a set of networked resources utilized to deploy one or more applications or services may be detected. In various embodiments, traffic may be characterized based on a log of the traffic and one or more data packets sampled of the traffic in the set of networked resources. In various such embodiments, attributes may be assigned to traffic in the set of networked resources based on characterization of the traffic. In many embodiments, a GUI may be produced that includes a first view with a configuration mapping of one or more networked resources in the set of networked resources. In many such embodiments, the configuration mapping may include indications of traffic through the one or more networked resources and indications of one or more attributes of the traffic at the one or more networked resources. These and other embodiments are described and claimed.

Some challenges facing network management include an inability to determine situational awareness of a set of networked resources. These challenges may result from actual traffic associated with networked resources or components implemented thereby (e.g., an application, an instance, an application program interface (API), a database, a computing network) not being confirmable, visible, or otherwise determinable. For example, traffic routing may be displayed as a ratio or a percentage and is agnostic about how much traffic is actually crossing the system, making routing hidden and problematic. Adding further complexity, a set of networked resources may be divided into multiple regions and routing in the multiple regions may be handled independently. Without integrated traffic routing between different regions, redirecting traffic to different regions may be difficult or impossible. These and other factors may result in network management with limited scalability, deficient performance, poor adaptability, and insufficient ability to provide optimal and efficient situational awareness. Such limitations can drastically reduce the capabilities, usability, and applicability of components in the network, contributing to inefficient systems with limited capabilities.

Various embodiments described herein include a dynamic network manager that is able to combine configuration data and monitoring data to visualize network state and/or give near real-time situational awareness regarding traffic and components in a set of networked resources, such as networked resources in a cloud infrastructure. In some embodiments, traffic routing may be interpreted to identify a region in the network that a traffic will go based on where the traffic was generated. In many embodiments, this may enable creation of a unique report that show percentage of traffic routing between any number of network regions. In one or more embodiments, a log may be captured regarding which way traffic is directed among regions and/or components of a set of networked resources.

In several embodiments, logs, traffic characteristics, and/or network configuration may be utilized to apply attributes to traffic. In several such embodiments, the attributes may include one or more of traffic type, directionality, traffic end points, health checks, creation environment, and time. In various embodiments, traffic may be monitored and/or controlled based on these attributes. In some embodiments control schemes may be implemented based, at least in part, on these attributes. For instance, traffic routing between components in different regions may be implemented based, at least in part, on one or more of the attributes. In another instance, traffic may be routed based on traffic type. In various embodiments, the techniques and capabilities described herein may improve network resiliency, such as by improving failover.

In these and other ways the dynamic network manager may enable quick and effective network visualization, situational awareness, and/or to enable network control in an accurate, robust, efficient, dynamic, and scalable manner, resulting in several technical effects and advantages over conventional computer technology, including increased capabilities and improved adaptability. In various embodiments, the dynamic network manager may be implemented in a practical application via one or more computing devices, and thereby provide additional and useful functionality to the one or more computing devices, resulting in more capable, better functioning, and improved computing devices. In one or more embodiments, the dynamic network manager may be implemented as a set of rules that improve computer-related technology by allowing a function not previously performable by a computer that enables an improved technological result to be achieved. In one or more such embodiments, the function may include visualizing and/or controlling network configurations and traffic routing to gain novel and useful network state visualizations and situational awareness as an improved technological result. In some embodiments, the dynamic network manager may enable a computing device to improve robustness and increase reliability such as by efficiently collecting, analyzing, combining, and/or transforming network and traffic data to visualize network state and/or give near real-time situational awareness regarding traffic and components in a set of networked resources.

Various embodiments described herein may include an apparatus comprising a processor and a memory comprising instructions that, when executed by the processor, cause the processor to perform operations comprising one or more of: detect a configuration of a set of networked resources utilized to deploy an application; log traffic through each networked resource in the set of networked resources, the traffic comprising a plurality of packets; sample one or more packets of the traffic through each networked resource in the set of networked resources; characterize the traffic at each networked resource in the set of networked resources based on the log of the traffic at each networked resource in the set of networked resources and the one or more data packets sampled of the traffic at each networked resource in the set of networked resources; assign two or more attributes to traffic at each networked resource in the set of networked resources based on characterization of the traffic at each networked resource in the set of networked resources; and produce a graphical user interface (GUI), the GUI to include a first view with a configuration mapping of one or more networked resources in the set of networked resources, the configuration mapping generated based on the configuration of the set of networked resources detected, and the configuration mapping to include indications of traffic through the one or more networked resources and indications of one or more attributes of the traffic at the one or more networked resources.

One or more embodiments described herein may include at least one non-transitory computer-readable medium comprising a set of instructions that, in response to being executed by a processor circuit, cause the processor circuit to perform one or more of: detect a configuration of a set of networked resources utilized to deploy an application; monitor utilization of each networked resource in the set of networked resources; log traffic through each networked resource in the set of networked resources, the traffic comprising a plurality of packets; sample one or more packets of the traffic through each networked resource in the set of networked resources; characterize the traffic at each networked resource in the set of networked resources based on the log of the traffic at each networked resource in the set of networked resources and the one or more packets sampled of the traffic at each networked resource in the set of networked resources; assign two or more attributes to traffic at each networked resource in the set of networked resources based on characterization of the traffic at each networked resource in the set of networked resources; and direct one or more packets from a first networked resource in the set of networked resources to a second networked resource in the set of networked resources based on at least one of the one or more attributes assigned to traffic at the first networked resource and utilization of the first networked resource.

Some embodiments described herein may include a computer-implemented method comprising one or more of: detecting a configuration of a set of networked resources utilized to deploy an application; monitoring traversal of a first data packet across one or more network nodes in the set of networked resources to determine a set of characteristics for the first data packet; determining a set of attributes for the first data packet based on the configuration of the set of networked resources and the set of characteristics for the first data packet, wherein the set of attributes include two or more of traffic type, origin, target destination, actual destination, one or more relays, transmission time, and creation environment; and producing a graphical user interface (GUI), the GUI to include a first view with a configuration mapping of one or more networked resources in the set of networked resources, the configuration mapping generated based on the configuration of the set of networked resources, and the configuration mapping to include indications of traffic through the one or more networked resources in the configuration mapping.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given. For instance, in some embodiments, a machine may include a virtual machine implemented on a computing platform.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an embodiment of an operating environment 100 according to one or more embodiments described herein. Operating environment 100 includes a user 102, an interconnect 104, and a set of networked resources 105. In various embodiments, the user 102 may connect and/or communicate with the set of networked resource 105 via the interconnect 104. For example, the interconnect 104 may be or include one or more portions of the World Wide Web, such as a website. In many embodiments, the set of networked resources 105 may provide, or the user 102 may access, one or more applications and/or services via the interconnect 104. In some embodiments, the set of networked resources 105 may include a dynamic network manager 110, one or more physical resources 120, and one or more cloud resources 140. In one or more embodiments described herein the dynamic network manager 110 may monitor traffic and the networked resources 105, such as based on applied attributes, to generate network state visualizations and/or give near real-time situational awareness regarding traffic and components in the set of networked resources 105. Embodiments are not limited in this context.

In the illustrated embodiment, dynamic network manager 110 may include traffic monitor 112, resource monitor 114, traffic director 116, and graphical interface generator 118. In various embodiments, traffic monitor 112 may monitor and/or sample traffic flow among networked resources 105 to determine one or more characteristics of the traffic. In various such embodiments, traffic monitor 112 may apply various attributes to traffic based on the monitoring and/or sampling of traffic flow among networked resources 105. In many embodiments, resource monitor 114 may monitor one or more operational parameters of resources in the set of networked resources 105, such as physical resources 120 and cloud resources 140. In many such embodiments, the resources may be utilized to implement one or more services or applications, which may be illustrated as being within the set of networked resources 105. For example, in operating environment 100, dynamic network manager 110 may be a service implemented by one or more of the set of networked resources 105.

In one or more embodiments, physical resources 120 may include any physical hardware that is directly controlled, employed, and/or owned by the entity that provides the services and or applications implemented by the set of networked resources 105. On the other hand, in various embodiments, cloud resources 140 may refer to a pool of hardware that is utilized to provide computational or data services to the entity without the entity having physical access or control over the hardware providing the computational or data services.

In some embodiments, traffic director 116 may route traffic among various components of networked resources 105, such as physical resources 120 and cloud resources 140. In some such embodiments, traffic director 116 may route traffic to different components in the set of networked resources 105 based on one or more aspects or attributes identified or applied to the traffic by traffic monitor 112 and/or resources monitor 114. For example, traffic director 116 may route traffic in networked resources 105 based on a traffic type. As used herein, components of networked resources 105 may include one or more hardware components (e.g., physical resources 120) or software components (e.g., dynamic network manager 110) included in and/or implemented by the set of networked resources 105. In various embodiments, graphical interface generator 118 may create one or more graphical user interfaces (GUIs) with one or more views to visualize network state, component state, and/or traffic flow in networked resources 105, such as to provide improved situational awareness to network administrators. In various such, embodiments, graphical interface generator 118 may enable a network administrator to interact with and control various operational aspects and/or components of the set of networked resources 105 or traffic flow therein. In some embodiments, the network state, component state, and/or traffic flow in networked resources 105 may be communicated via one or more of an RSS feed, extensible markup language (XML), a data structure, a data base, and the like.

Figure 2A:
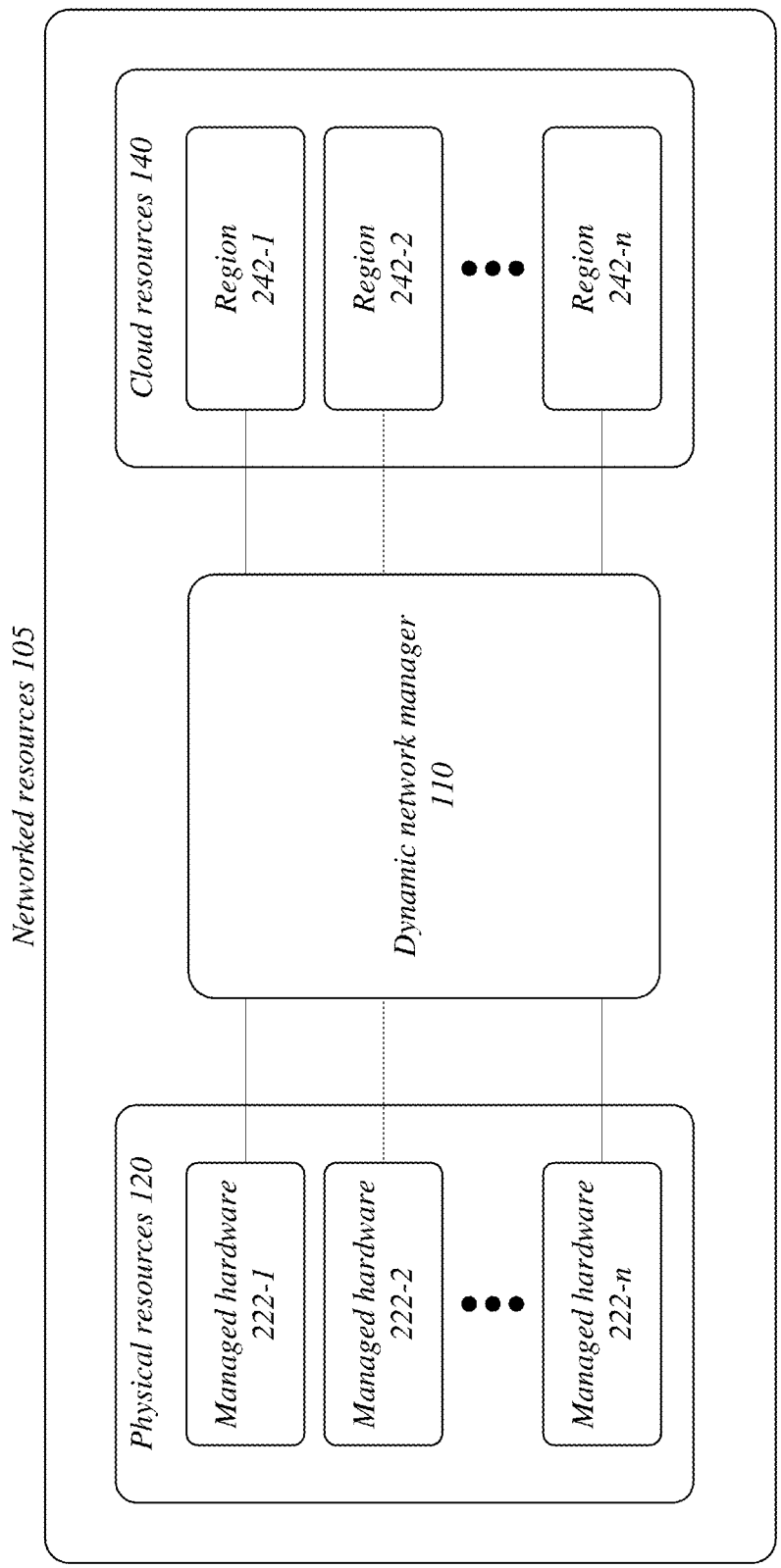
FIGS. 2A and 2B illustrate exemplary aspects of networked resources according to one or more embodiments described herein.
Figure 2B:
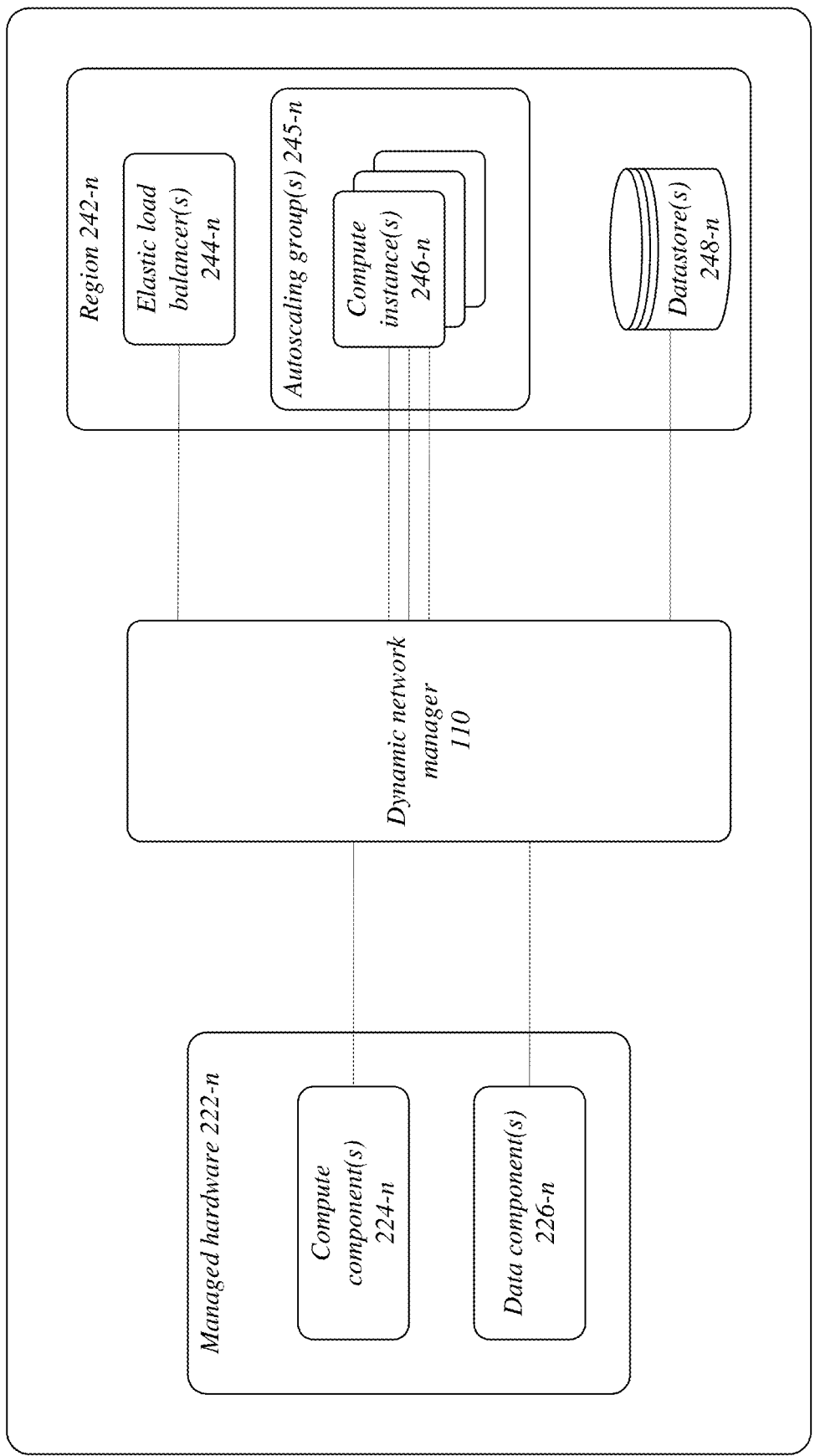

FIGS. 2A and 2B illustrate exemplary aspects of networked resources 105 in environments 200A, 200B according to one or more embodiments described herein. In one or more embodiments environments 200A, 200B may include various components of networked resources 105. In environment 200A, the components of networked resources 105 may include dynamic network manager 110, physical resources 120 with one or more managed hardware 222-1, 222-2, 222-n, and cloud resources 140 with one or more regions 242-1, 242-2, 242-n. In environment 200B, the components of networked resources 105 may include dynamic network manager 110, managed hardware 222-n with one or more compute components 224-n and one or more data components 226-n, and region 242-n with one or more elastic load balances 244-n, one or more autoscaling groups 245-n with one or more compute instances 246-n, and one or more datastores 248-n. In several embodiments, one or more components of environment 200B may be implemented by (e.g., executed on) one or more components of environment 200A. It will be appreciated that in environment 200B only the components implemented by managed hardware 222-n and region 242-n are illustrated and described for simplicity, however, one or more other managed hardware (e.g., managed hardware 222-1, 222-2) and one or more other regions (e.g., regions 242-1, 242-2) may be the same or similar. Embodiments are not limited in this context.

In several embodiments described herein, dynamic network manager 110 may monitor and/or control one or more aspects or components of networked resources 105. In many embodiments, dynamic network manager 110 may monitor and/or control the flow of traffic to and from various components of networked resources 105. In various embodiments, dynamic network manager 110 may generate one or more visualizations, summaries, and status reports regarding components of the networked resources 105. For instance, dynamic network manager 110 may create one or more graphical user interfaces (GUIs) with one or more views to visualize network states, component states, and/or traffic flows in or among networked resources 105. In such instance, this may enable increased network reliability and improved situational awareness to network administrators.

Referring to FIG. 2A, in one or more embodiments, the one or more managed hardware 222-1, 222-2, 222-n may include various components of physical hardware that are directly controlled, employed, and/or owned by an entity that provides the services and or applications implemented by the set of networked resources 105. In many embodiments, the entity may have physical possession of one or more of managed hardware 222-1, 222-2, 222-n. On the other hand, in various embodiments, cloud resources 140 may refer to a pool of hardware that is utilized to provide computational or data services to the entity without the entity having physical access or control over the hardware providing the computational or data services. For example, cloud resources 140 may include computational or data services utilized (e.g., under a rental agreement) by the entity independent of the underlying hardware. In several embodiments, the cloud resources 140 may be divided into one or more regions 242-1, 242-2, 242-n. In several such embodiments, each of the one or more regions 242-1, 242-2, 242-n may include independent pools of hardware that are utilized to provide computational or data services to the entity. In many embodiments, physical resources 120 and/or cloud resources 140 may include and/or utilize one or more components illustrated in FIGS. 6 and 7.

Referring to FIG. 2B, in various embodiments, managed hardware 222-n and region 242-n may provide a platform to implement components, such as one or more applications and/or services. In several embodiments, components of managed hardware 222-n and/or region 242-n may comprise (e.g., be utilized to implement or host) one or more of an application programming interface (API), a data base, or enterprise systems. For example, components of managed hardware 222-n and/or region 242-n may include one or more components illustrated in FIGS. 3-5.

Figure 3:
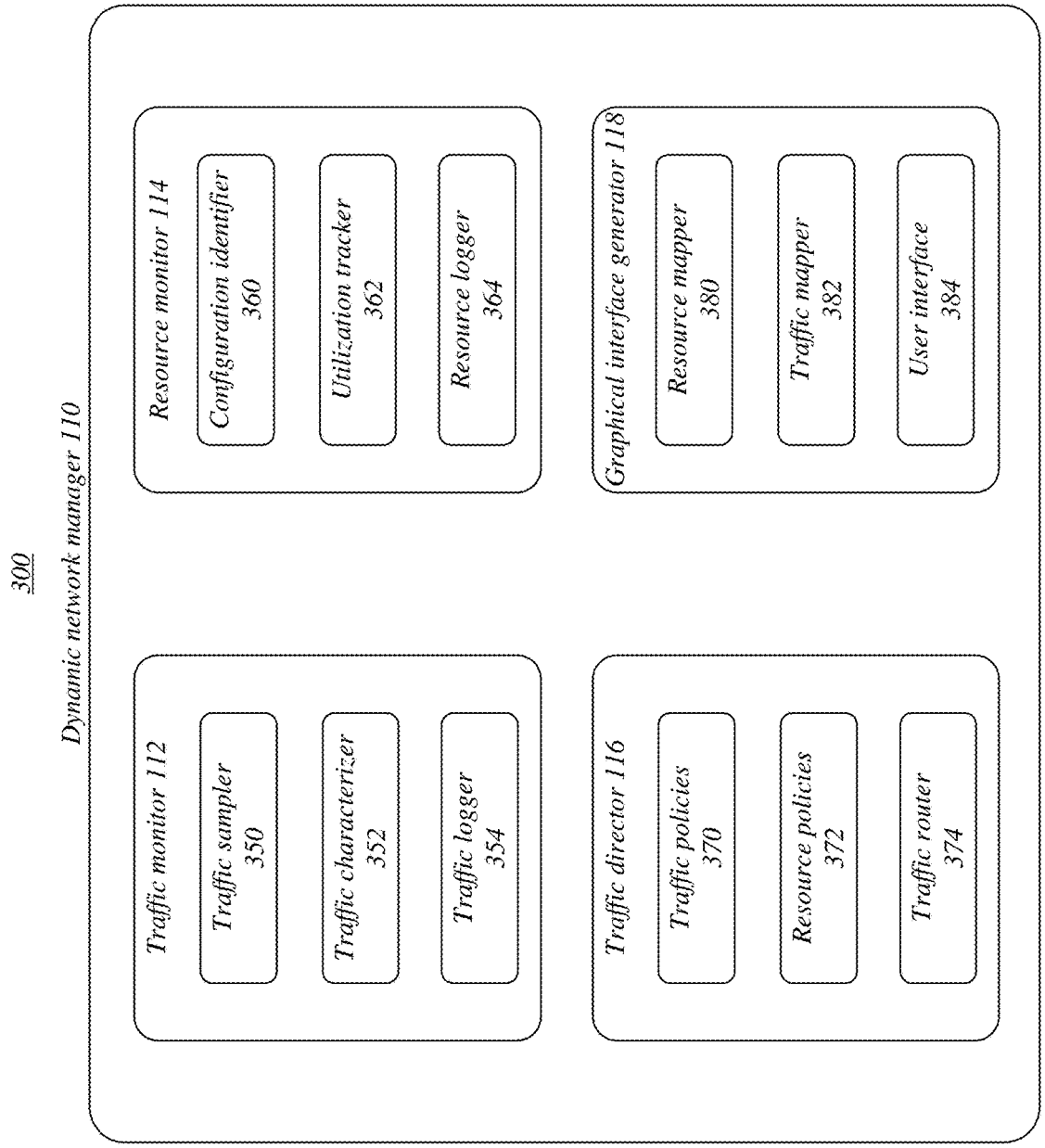
FIG. 3 illustrates exemplary aspects of a dynamic traffic manager according to one or more embodiments described herein.

FIG. 3 illustrates exemplary aspects of dynamic network manager 110 in environment 300 according to one or more embodiments described herein. In environment 300, dynamic network manager 110 may include traffic monitor 112, resource monitor 114, traffic director 116, and graphical interface generator 118. In the illustrated embodiments, traffic monitor 112 may include traffic sampler 350, traffic characterizer 352, and traffic logger 354, resource monitor 114 may include configuration identifier 360, utilization tracker 362, and resource logger 364, traffic director 116 may include traffic policies 370, resource policies 372, and traffic router 374, and graphical interface generator 118 may include resource mapper 380, traffic mapper 382, and user interface 384. In one or more embodiments described herein, one or more components of dynamic network manager 110 in environment 300 may collect, analyze, combine, control, transform, and/or manipulate network and traffic data to visualize the state of, provide situational awareness regarding and/or control over traffic and components in a set of networked resources (e.g., networked resources 105). Embodiments are not limited in this context.

In various embodiments, traffic monitor 112 may monitor traffic flow, latency, and/or bandwidth among networked resources 105, such as via logs and/or traffic samples, to determine one or more characteristics of the traffic. In some embodiments, traffic characterizer 352 may utilize traffic sampler 350 and traffic logger 354 to characterize traffic and apply attributes to the traffic or components there of (e.g., network packets). For example, by sampling traffic at various components with traffic sampler 350, not just the actual traffic can be confirmed, but also the type and amount as a function of packets, unique users (e.g., a person or business process), and anomalies in bandwidth by traffic type can be determined.

In one or more embodiments, traffic logger 354 may capture a log about aspects of traffic, such as which way traffic is directed. In one or more such embodiments, capturing, sampling, and/or characterizing this traffic may enable additional attributes to be applied, such as attributes associated with one or more of traffic type, directionality, traffic endpoints, health checks, environment, and time. In some embodiments, the attributes may be applied by traffic characterizer 352. In various embodiments, a type of traffic could be actual user requested functions (like interacting with an application or database), data queries, code packets, and/or data packets. In many embodiments, all traffic within the set of networked resources 105 may be a 'data packet' until it is realized through some other expressed function.

In several embodiments, directionality may refer to where direction may be redirected to a different region or even to a separate set of resources (e.g., between physical resources 120 and cloud resources 140). In many embodiments, for instance, traffic monitor 112 may capture Eastbound traffic redirected to West and retain this as an attribute. In some embodiments, the flow of traffic (e.g., network packets) from origin to endpoint can be retained as an attribute. In one or more embodiments, the directionality of traffic may be determined based on traffic logs. In various embodiments traffic endpoints may be retained as a function of Start and End by geographic policy. In many embodiments, the geographic policy may crossover from an intended endpoint to a different endpoint. In one or more embodiments, health checks may refer to the integrity of any attributes of the traffic, such as one or more of infection, corruption, or other of the actual data, the origin, and the endpoint. In some embodiments, the environment attribute may be associated with a creation environment of traffic. In various embodiments, time may be associated with time of the traffic or policies applied to traffic based on the time of day. As will be discussed in more detail below, in several embodiments, traffic director 116 may store and enforce one or more policies associated with traffic and or components of networked resources 105, such as routing based on attributes.

In many embodiments, resource monitor 114 may monitor one or more operational parameters of resources in the set of networked resources 105, such as physical resources 120 and cloud resources 140. In some embodiments, resource monitor 114 may include one or more of configuration identifier 360, utilization tracker 362, and resource logger 364. In various embodiments, configuration identifier 360 may be utilized to detect a configuration of a set of networked resources. In several embodiments, utilization tracker 362 may monitor utilization of various components in the set of networked resources. For example, utilization tracker 362 may monitor an amount of additional traffic a component can handle, latency, and/or available bandwidth. In some embodiments, one or more traffic policies 370 and/or resource policies 372 may be based on utilization thresholds. For example, traffic may be routed differently, or additional compute resources may be allocated to a component based on utilization crossing a threshold. In various embodiments, resource logger 364 may capture a log about aspects of resources, such as operational parameters of the resources.

In many embodiments, one or more components of traffic monitor 112 and/or resource monitor 114 may operate to enable earlier and more granular intercepts that provide both a monitoring application and another connection point to the set of networked resources. In some embodiments, monitoring may be expressed at the application packet level. In some such embodiments, this may enable a set of networked resources that supports numerous applications to be expressed by application (see e.g., FIGS. 4 and 5) or even application sublevel (e.g., process). For example, 10% of traffic for an application may be routed to a first region and 90% of traffic for the application may be routed to a second region. In such examples, this routing can still be accomplished when some to most of the supporting infrastructure for other applications reside in the same regions.

In various embodiments, monitoring may be achieved by connecting and logging traffic types as they move through a set of networked resources. In various such embodiments, monitoring may enable one or more of the following embodiments and/or examples. In some embodiments, monitoring can enable traffic confirmation. For example, monitoring can be used to confirm that a routing policy is being properly implemented. Accordingly, monitoring could be used to verify that 90% of traffic is being routed to a first region and 10% of traffic is being routed to a second region, such as pursuant a corresponding geographic traffic routing policy.

In one or more embodiments, monitoring by sampling traffic at various components, such as with traffic sampler 350, the type and amount as a function of packets, unique users (e.g., a person or business process), and anomalies in bandwidth by traffic type can be determined. In several embodiments, monitoring may facilitate control. For instance, the traffic type control indication, like bandwidth, may track deviation of expected traffic types and be used to selectively adjust a geographic policy and other upstream routing controls so that more traffic of a certain type becomes the actual downstream experience (e.g., via traffic director 116).

In many embodiments, monitoring can enable faster failover to dark instances. In various embodiments, dark instances may enable production failover quicker than autoscaling or regional failover. By coupling dark instance failover with traffic type monitors, even faster failover may be enabled (e.g., via traffic director 116) because the system can be more intelligent and deliberate about what and how much can be routed where in a failover scenario. In some embodiments, this may enable failover to happen without a loss in quality of service (QOS) (e.g., without the user noticing). In some embodiments, dark instances may replicate one or more components of the set of networked resources. In some such embodiments, the dark instances may have little or no traffic flowing through them and serve as a standby. In various embodiments, dark instances may be patched, configured, and/or kept in sync with traffic-loaded instances. In one or more embodiments described herein, certain types of traffic (e.g., based on attributes) may be directed to dark instances, such as to free the primary active system from risk of peak bandwidth utilization.

In some embodiments, traffic director 116 may route traffic among various components of networked resources 105, such as physical resources 120 and cloud resources 140. In some such embodiments, traffic director 116 may route traffic to different components in the set of networked resources 105 based on one or more aspects or attributes identified or applied to the traffic by traffic monitor 112 and/or resources monitor 114. In many embodiments, traffic router 374 may route traffic based one or more of traffic policies 370 and/or resource policies 372. In many such embodiments, traffic policies 370 may result from observations by traffic monitor 112 and/or resources policies 372 may result from observations by resource monitor 114.

For example, traffic director 116 may route traffic in networked resources 105 based on creation environment as assigned by traffic characterizer 352. In such examples, production data may be routed differently than test, quality assurance, pre-production, failover, disaster recovery, or development region traffic. In one or more embodiments, routing based on creation environment may allow routing based on a development region where the actual region can be the actual production system. In this way, tests may be conducted within production without compromising the production or other environments. In another example, traffic router 374 may route traffic based on the time attribute. For example, traffic may be routed differently based on time of day such that during peak usage times, more traffic is routed to other regions.

In one or more embodiments, traffic router 374 may implement arbitrarily complex routing schemes, such as based on one or more traffic policies 370 and/or one or more resource policies 372. In some embodiments, traffic may be routed at any level or component in the set of networked resources 105. In some such embodiments, this may enable a set of networked resources that supports numerous applications to be expressed by application (see e.g., FIGS. 4 and 5) or even application sublevel (e.g., process). For example, 10% of traffic for an application may be routed to a first region and 90% of traffic for the application may be routed to a second region. In such examples, this routing can still be accomplished when some to most of the supporting infrastructure for other applications reside in the same regions.

In some embodiments, one or more components of dynamic network manager 110 may be utilized in network zero scenarios. This may include a circumstance that happens when there is a sudden drop in network traffic. While a network administrator may intentionally do this to free up a region for maintenance or other work, it can also happen as a result of hardware problems, cyber security threats, and routing issues that prevent traffic from moving through network components. In various embodiments, these issues may be identified and remedied via dynamic network manager 110. In some embodiments, custom alerts and notices may be generated by dynamic network manager 110, such as based on monitoring and/or thresholds.

In many embodiments, dynamic network manager 110, by using traffic attributes, may evaluate actual traffic type bandwidth. In some embodiments, by pairing this with usage patterns over time (e.g., based on logs), and by looking at the affects, useful features/capabilities may be realized. For example, if a system is currently configured with a 90/10 split between first and second regions and something happens in the system that causes the first region traffic to drop from 90% to 20% without causing latency issues or error logging, dynamic network manager 110 may still be able to identify and immediately adjust the second region to 80% and the first region to 20%, as well as generate alerts associated with the first region that something unexpected occurred. In this scenario, dynamic network manager 110 may be able to determine that the first region was serving 5 distinct types of user traffic (e.g., user, business to business (B2B), extensible markup language (XML) packet transfer, and 2 APIs) and the 70% reduction in traffic resulted from the failure of the 2 APIs.

In various embodiments, graphical interface generator 118 may create one or more graphical user interfaces (GUIs) with one or more views to visualize network state, component state, alerts, notices, settings, configurations, and/or traffic flow in networked resources 105, such as to provide improved situational awareness to network administrators. In various such, embodiments, graphical interface generator 118 may enable a network administrator to interact with and control various operational aspects and/or components of the set of networked resources 105 or traffic flow therein. In the illustrated embodiments, graphical interface generator 118 may include resource mapper 380, traffic mapper 382, and user interface 384.

Figure 5:
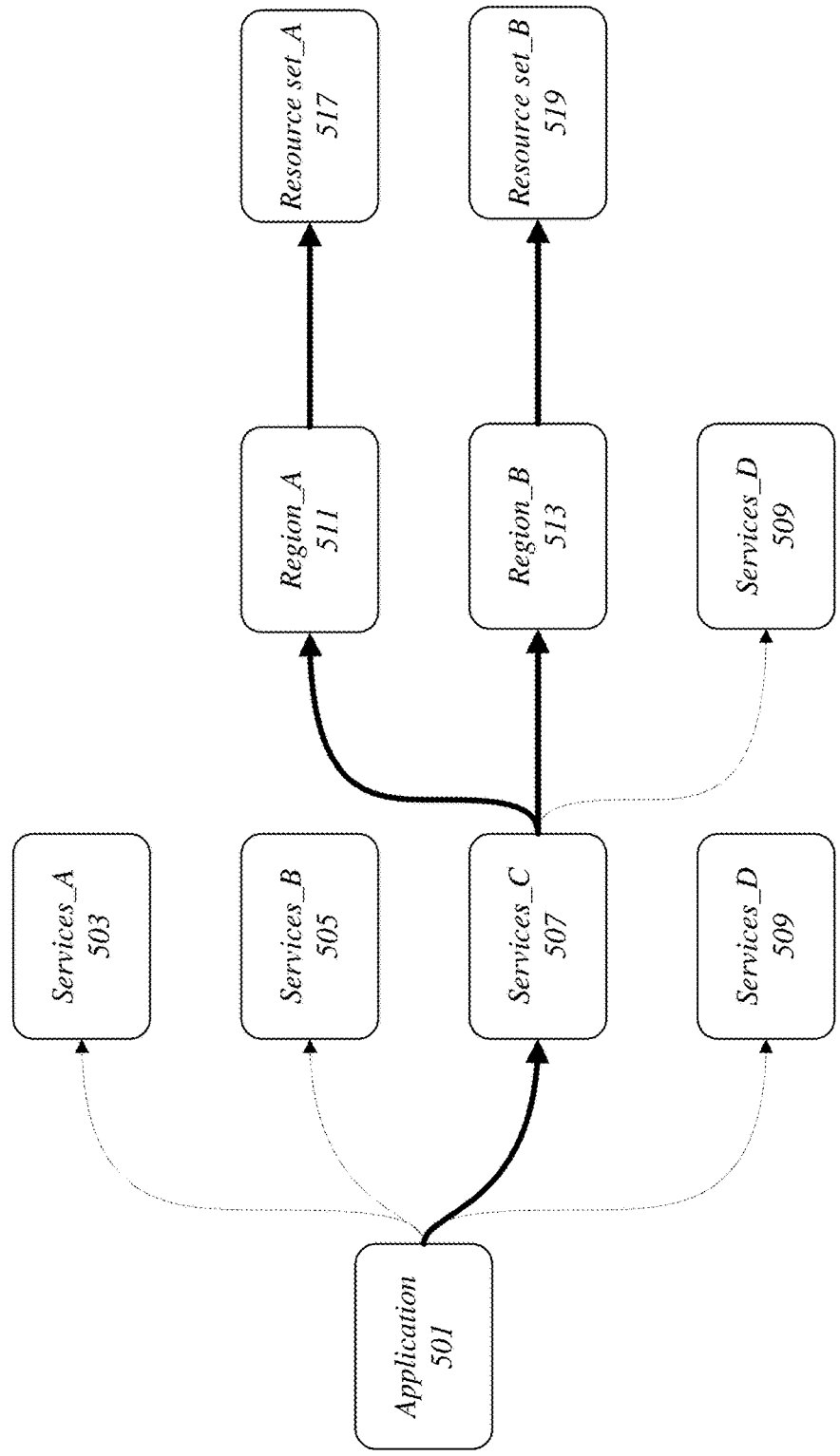
FIG. 5 illustrates exemplary aspects of a configuration mapping according to one or more embodiments described herein.

In many embodiments, resource mapper 380 may map the configuration/state of a set of networked resources and traffic mapper 382 may map traffic flow/characteristics in the set of networked resources (see e.g., FIGS. 4 and 5). In various embodiments, resource mapper 380 may utilize data from one or more of resource monitor 114 and traffic director 116 and traffic mapper may utilize data from one or more of traffic monitor 112 and traffic director 116. In some embodiments, user interface 384 may generate one or more GUIs with one or more views to communicate and enable a user (e.g., a network administrator) to interact with the mappings by resource mapper 380 and/or traffic mapper 382. As will be discussed in more detail below, in one or more embodiments, user interface 384 may produce a GUI view with a traffic summary (see e.g., FIG. 4) and/or a GUI view with a configuration mapping (see e.g., FIG. 5)

FIG. 4 illustrates exemplary aspects of traffic summary 486 in environment 400, according to one or more embodiments described herein. In various embodiments, a traffic summary may include one or more attributes or parameters associated with traffic in a set of networked resources. In the illustrated embodiment, traffic summary 486 may illustrate traffic grouped by type including branded book 490, commercial 492, and digiTECH 494. Further, traffic summary 486 may include subgroupings beyond traffic type. In many embodiments, each traffic type may be further sorted by application and parameters for each application may be provided. In one or more embodiments described herein, each grouping, subgrouping, and/or parameter may comprise a component in the set of networked resources. Embodiments are not limited in this context.

As illustrated in environment 400, each traffic type (i.e., branded book 490, commercial 492, and digiTECH 494) in traffic summary 486 may be further grouped by application and data regarding policy and regional routing may be provided for each application. In some embodiments, the regional routing may be settings of the identified policy. For example, for the application 'CreditPath' for the commercial traffic type 492, a failover policy may be in place with 100% of traffic going to an east region and 0% of the traffic going to a west region. In many embodiments, a user (e.g., a network administrator) may be able to view and or manipulate each of the parameters and settings illustrated in traffic summary 486, such as via user interface 384. For example, the policy parameters may be adjusted or set. In some embodiments, more details may be accessed by selecting aspects of the traffic summary. For example, the configuration mapping 595 of FIG. 5 may be access by selecting an application in traffic summary 486.

FIG. 5 illustrates exemplary aspects of configuration mapping 595 in environment 500, according to one or more embodiments described herein. In some embodiments, configuration mapping 595 may illustrate the configuration and/or traffic flow through one or more components in a set of networked resources. In some embodiments, the solid lines may indicate where traffic is flowing and the dotted lines may indicate a lack of traffic flow. In environment 500, the components illustrated with graphical representations in configuration mapping 595 may include application 501, services_A 503, services_B 505, services_C 507, services_D 509, region_A 511, region_B 513, resource set_A 517, and resource set_B 519. Embodiments are not limited in this context.

In one or more embodiments, configurations of networked resources may be created, adjusted, and/or set by manipulating the graphical representations and connections therebetween in configuration mapping 595. For instance, traffic may be rerouted from services_C 507 to services_A 503 or weightings between different services or regions may be adjusted. In some embodiments, weightings between different components may be illustrated in configuration mapping 595. In another example, components of a resource set may be adjusted. In some embodiments, failover schemes may be implemented or visualized via configuration mapping 595. For example, in environment 500, services_D 515 may be set as a failover for services_C 507.

In various embodiments, selection of graphical representations in configuration mapping 595 may reveal more detailed information. For example, more detailed data regarding services_C 507 is shown in FIG. 5 as a result of services_C 507 being selected. In such examples, further information regarding services_A may be revealed or the components of resource set_B 519 may be revealed in response to selection. In one or more embodiments, line weights may be used to indicate relative amounts of traffic flowing to various components. In many embodiments, numerical indications of traffic flow or components parameters may be explicitly indicated in configuration mapping 595. For example, the traffic flow split between region_A 511 and region_B 513 may be indicated as percentages.

Figure 6:
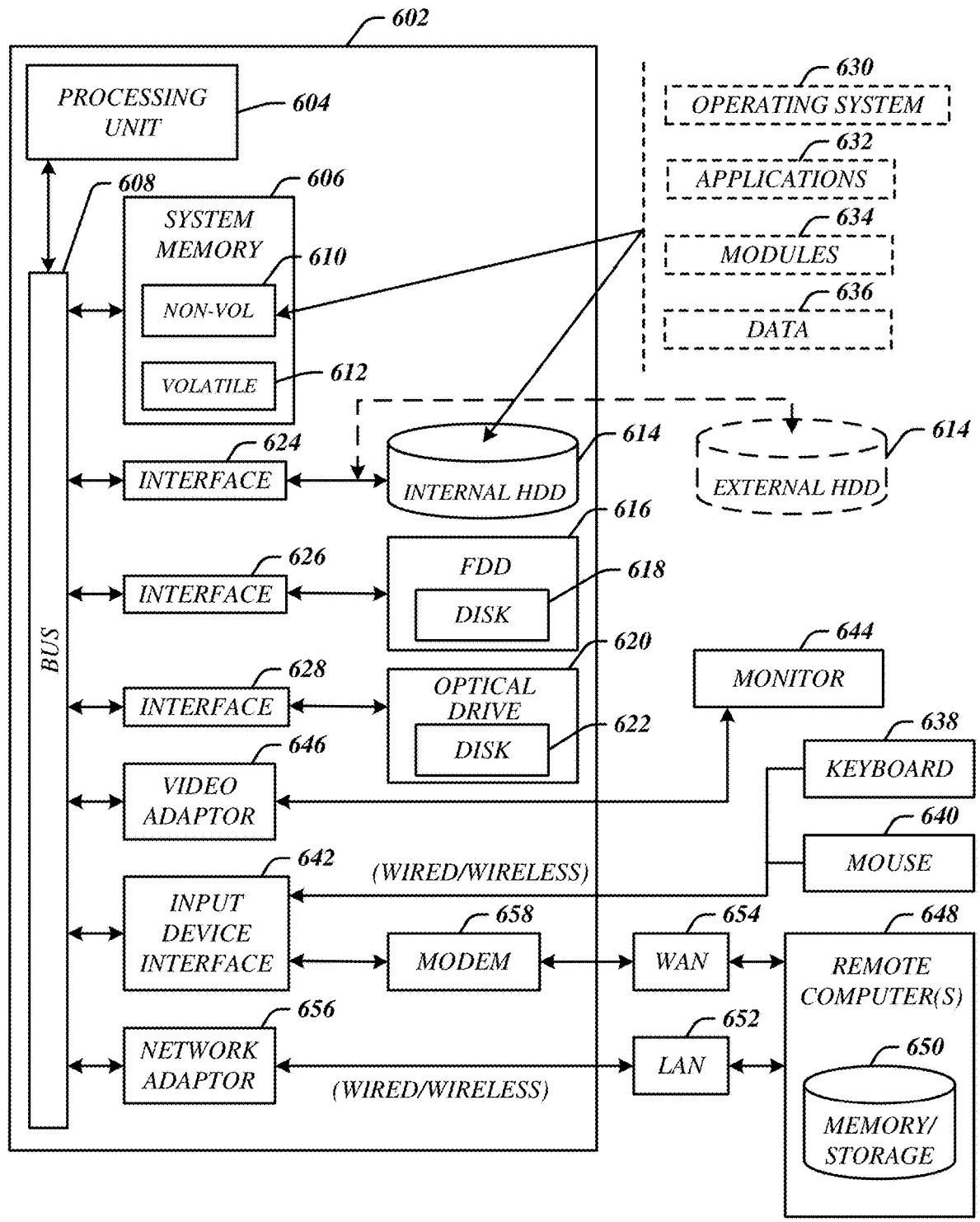
FIG. 6 illustrates exemplary aspects of a computing architecture according to one or more embodiments described herein.

FIG. 6 illustrates an embodiment of an exemplary computing architecture 600 that may be suitable for implementing various embodiments as previously described. In various embodiments, the computing architecture 600 may comprise or be implemented as part of an electronic device. In some embodiments, the computing architecture 600 may be representative, for example, of a computer system that implements one or more components described herein. In some embodiments, computing architecture 600 may be representative, for example, one or more portions, such as hardware components, of networked resources 105 that implement one or more embodiments, such as software components, described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components described herein.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 994 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. In various embodiments, interactions described herein may occur via the networked environment. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
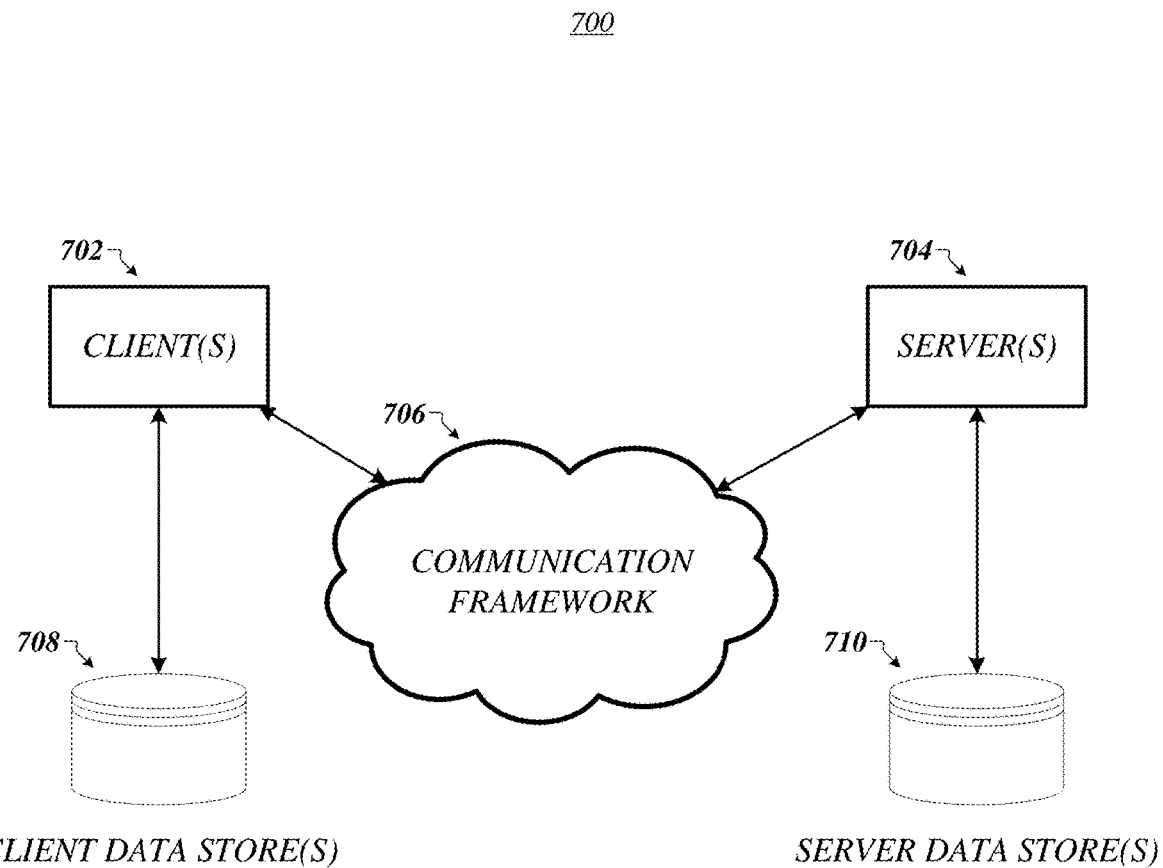
FIG. 7 illustrates exemplary aspects of a communications architecture according to one or more embodiments described herein.

FIG. 7 illustrates a block diagram of an exemplary communications architecture 700 suitable for implementing various embodiments as previously described, such as applications or services described herein. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described herein, and storage mediums described herein, such as in conjunction with storage of data received from any one of clients 702 on any of server data stores 710.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method comprising:
monitoring a flow of traffic through one or more network resources in a set of network resources, the flow of traffic including data packets for one or more applications;
characterizing the flow of traffic based at least on a packet type of the data packets;
applying an attribute to at least one data packet for a particular application of the flow of traffic based on the packet type of the at least one data packet; and
routing the at least one data packet through the one or more network resources based on the applied attribute.

2. The method of claim 1, wherein monitoring the flow of traffic includes monitoring the flow of traffic based on a latency or bandwidth of the flow of traffic.

3. The method of claim 1, wherein monitoring the flow of traffic includes monitoring the flow of traffic using logs or traffic samples of the flow of traffic.

4. The method of claim 1, wherein characterizing the flow of traffic further includes characterizing the flow of traffic based on a number of packets for the packet type, a number of unique users engaging in the flow of traffic, or anomalies in bandwidth by traffic type.

5. The method of claim 1, wherein applying the attribute includes applying attributes related to traffic type, directionality, traffic endpoints, health checks, environment, or time.

6. The method of claim 1, wherein routing the at least one data packet through the one or more network includes routing the at least one data packet through a dark instance of the network resources.

7. The method of claim 6, wherein the dark instance is a failover link in the network resources, and routing the at least one data packet through the dark instance frees up bandwidth on a primary active link in the network resources.

8. The method of claim 1, wherein routing the at least one data packet further includes routing the at least one data packet based on one or more traffic policies or one or more resource policies, wherein the one or more traffic policies and the one or more resource policies are generated based on monitoring the flow of traffic.

9. The method of claim 1, wherein applying the attribute includes applying an attribute that indicates that the traffic flow is related to production data or non-production data, and
wherein routing the at least one data packet includes routing the production data through a different part of the network resources compared to the non-production data.

10. The method of claim 1, wherein applying the attribute further includes applying a time attribute to the at least one data packet; and
wherein routing the at least one data packet includes routing the traffic flow through a part of the network resources during peak usage times that is different than when the traffic flow is not at peak usage times.

11. An apparatus comprising:
a memory having executable instructions stored thereon;
a processing circuit coupled to the memory to execute the executable instructions, which when executed by the processing circuit, causes the processing circuit to:
monitor a flow of data packets through one or more network devices in a set of network devices, the flow of data packets including data packets for one or more applications;
apply an attribute to at least one data packet for a particular application of the flow of data packets based on a packet type of the at least one data packet; and
route the at least one data packet through the one or more network devices based on the applied attribute.

12. The apparatus of claim 11, wherein monitoring the flow of data packets includes monitoring the flow of data packets based on a latency or bandwidth of the flow of data packets.

13. The apparatus of claim 11, wherein monitoring the flow of data packets includes monitoring the flow of data packets using logs or data packets samples of the flow of data packets.

14. The apparatus of claim 11, wherein applying the attribute is further based on a number of packets for the packet type, a number of unique users engaging in the flow of data packets, or anomalies in bandwidth by data packets type.

15. The apparatus of claim 11, wherein applying the attribute includes applying attributes related to data packet type, directionality, data packet endpoints, health checks, environment, or time.

16. The apparatus of claim 11, wherein routing the at least one data packet through the one or more network devices includes routing the at least one data packet through a redundant path of the one or more network devices.

17. The apparatus of claim 16, wherein routing the at least one data packet through the redundant path frees up bandwidth on a primary active path in the network devices.

18. The apparatus of claim 11, wherein routing the at least one data packet further includes routing the at least one data packet based on one or more traffic policies or one or more resource policies, wherein the one or more traffic policies and the one or more resource policies are generated based on monitoring the flow of data packets.

19. The apparatus of claim 11, wherein applying the attribute includes applying an attribute that indicates that the data packets are related to production data or non-production data, and wherein routing the at least one data packet includes routing the production data through a different part of the network devices compared to the non-production data.

20. The apparatus of claim 11, wherein applying the attribute further includes applying a time attribute to the at least one data packet; and wherein routing the at least one data packet includes routing the at least one data packet through a part of the network devices during peak usage times that is different than during non-peak usage times.

\* \* \* \* \*